United States Patent
Kwapniewski et al.

(10) Patent No.: US 8,018,941 B2
(45) Date of Patent: Sep. 13, 2011

(54) DEMAND-BASED DISTRIBUTION OF INTERNET PROTOCOL ROUTING INFORMATION ACROSS A NETWORK

(75) Inventors: Richard Kwapniewski, Middletown, NJ (US); Thomas Bradley Scholl, Seattle, WA (US); Simon Zelingher, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 78 days.

(21) Appl. No.: 12/286,365

(22) Filed: Sep. 30, 2008

(65) Prior Publication Data

US 2010/0080228 A1    Apr. 1, 2010

(51) Int. Cl.
*H04L 12/56* (2006.01)
(52) U.S. Cl. .................................. 370/392; 370/389
(58) Field of Classification Search ............. 370/392, 370/389
See application file for complete search history.

(56) References Cited

U.S. PATENT DOCUMENTS

| | | | | |
|---|---|---|---|---|
| 6,310,878 | B1* | 10/2001 | Bodnar et al. | 370/396 |
| 7,035,261 | B2* | 4/2006 | Ogawa et al. | 370/392 |
| 7,493,412 | B2* | 2/2009 | Herkersdorf et al. | 709/238 |
| 7,552,234 | B2* | 6/2009 | Thubert et al. | 709/238 |
| 7,583,665 | B1* | 9/2009 | Duncan et al. | 370/389 |
| 7,606,160 | B2* | 10/2009 | Klinker et al. | 370/238 |
| 2004/0202183 | A1* | 10/2004 | Thubert et al. | 370/395.31 |
| 2004/0228343 | A1* | 11/2004 | Molteni et al. | 370/392 |
| 2005/0041671 | A1* | 2/2005 | Ikeda et al. | 370/395.52 |
| 2007/0070883 | A1* | 3/2007 | Lysne et al. | 370/218 |
| 2007/0091795 | A1* | 4/2007 | Bonaventure et al. | 370/228 |
| 2007/0140128 | A1* | 6/2007 | Klinker et al. | 370/238 |
| 2009/0182896 | A1* | 7/2009 | Patterson et al. | 709/241 |
| 2010/0014518 | A1* | 1/2010 | Duncan et al. | 370/390 |

* cited by examiner

*Primary Examiner* — Daniel J Ryman
*Assistant Examiner* — Jay P Patel

(57) ABSTRACT

Systems and methods are described that disassociate Internet route table growth from the ability of a router to maintain service. A network operator may base their network design using predetermined devices implemented from the beginning of service as constrained routers. This eliminates concern that these devices would require upgrade or replacement in the future.

18 Claims, 15 Drawing Sheets

DEMAND-BASED DISTRIBUTION OF INTERNET PROTOCOL ROUTING INFORMATION ACROSS A NETWORK

BACKGROUND OF THE INVENTION

The invention relates generally to network engineering. More specifically, the invention relates to systems and methods that disassociate Internet Protocol (IP) route table growth from the ability of a router to offer IP services.

Today, network operators or Internet Service Providers (ISPs) are forced to periodically upgrade IP routing equipment to keep pace with their own internal growth as well as the rest of the Internet. Day by day, global Border Gateway Protocol (BGP) routing tables that comprise the Internet are constantly growing. This growth takes a toll on network equipment regarding memory to store routing tables and forwarding tables, and the processing power to create and maintain those tables.

Routers typically contain input ports, output ports, a specialized operating system, memory, and one or more processors. Distributed routers require memory for two purposes besides the operating system itself: storing a routing table which is used to perform routing decisions and program the forwarding table, and storing a forwarding table which is used when making forwarding decisions to forward packets out on particular interfaces.

These two functions are critical to the operation of any router employed on an IP network. Without sufficient memory, a router would be unable to properly forward packets. Due to Internet growth, network operators must upgrade their equipment to handle route growth and satisfy the above two purposes. This results in a cycle where equipment must be upgraded or replaced every 3 to 5 years. Furthermore, operators encounter scenarios where their hardware cannot be upgraded any further. This is due in part that when manufactured, there were technical limits prohibiting capacity expansion. For these cases, network operators have always been faced with replacing hardware.

Customer migrations are very complex and costly from the network operator point of view. Not only does additional hardware and capacity have to be ordered, but customers also must be notified of the inevitable service interruption. Lengthy migration strategies and tools must also be developed in order to move customers from one device to another. Additionally, to replace network hardware with state-of-the-art equipment includes major capital costs.

The challenge for network operators is to extend the operational life of their deployed networks and obviate the hardware upgrade/replacement cycle. In order to achieve this, a system and method is needed that allows a network operator to disassociate route table growth from the ability of a router to maintain service.

SUMMARY OF THE INVENTION

The inventors have discovered that it would be desirable to have systems and methods that disassociate IP route table growth from the ability of a router to maintain service. Embodiments enable network operators to continue to provide services on end-of-life (EOL), end-of-sale (EOS) or end-of-support hardware like routers, or the modules within a router such as processing modules and interface modules. Embodiments enable a network to continue to operate on existing equipment which has reached its limit to store routing or forwarding information, such as a "constrained router." A network operator may also base their network design using predetermined devices implemented from the beginning of service as constrained routers. This mitigates concern that these devices would require upgrade or replacement in the future. It also may allow a network operator to purchase lower cost equipment with lower memory requirements.

Embodiments allow a network operator to reduce the amount of routing and forwarding table states contained in routers. This is achieved by having a constrained router initially forward packets to a separate device called a helper router which contains a full routing/forwarding table until the constrained router receives a response to a prefix-request sent to a separate device called a route server which contains a full routing table. The constrained router only populates its route and forwarding tables for packets it needs to transmit. With a constrained router only concerned with routing information of packets that are traversing through the router, the amount of memory and processing required for the router for a complete routing table may be reduced.

One aspect of the invention provides a method for disassociating routing/forwarding tables from routers in a network. Methods according to this aspect of the invention include from all of the routers employed in the network, identifying at least one router as a constrained router, implementing at least one route server having a full route table for the network, receiving a packet at the constrained router, performing a route lookup at the constrained router for the destination address of the received packet and not finding a match, transmitting a prefix-request containing the destination of the received packet from the constrained router to the route server, and forwarding a route announcement containing a prefix from the route server to the constrained router which is an optimal next hop for the received packet.

Another aspect of the invention is where the prefix-request includes a source address corresponding to the constrained router, a destination address corresponding to the destination of the received packet, a protocol type identifying the datagram as a prefix-request, and a length of time the constrained router is allowed to use the route announcement prefix.

Another aspect of the invention include from all of the routers employed in the network, implementing at least one helper router having a full route table for the network, until the route announcement is received at the constrained router, forwarding the received packet at the constrained router and subsequently received packets not finding a match to the helper router where a forwarding look-up is performed, and forwarding the packet(s) received at helper router to an egress router.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions for disassociating route table growth from the ability of a router to maintain service. The invention may be implemented as a modular framework and deployed as software as an application program tangibly embodied on a program storage device. The application code for execution can reside on a plurality of different types of computer readable media known to those skilled in the art.

Figure 1:
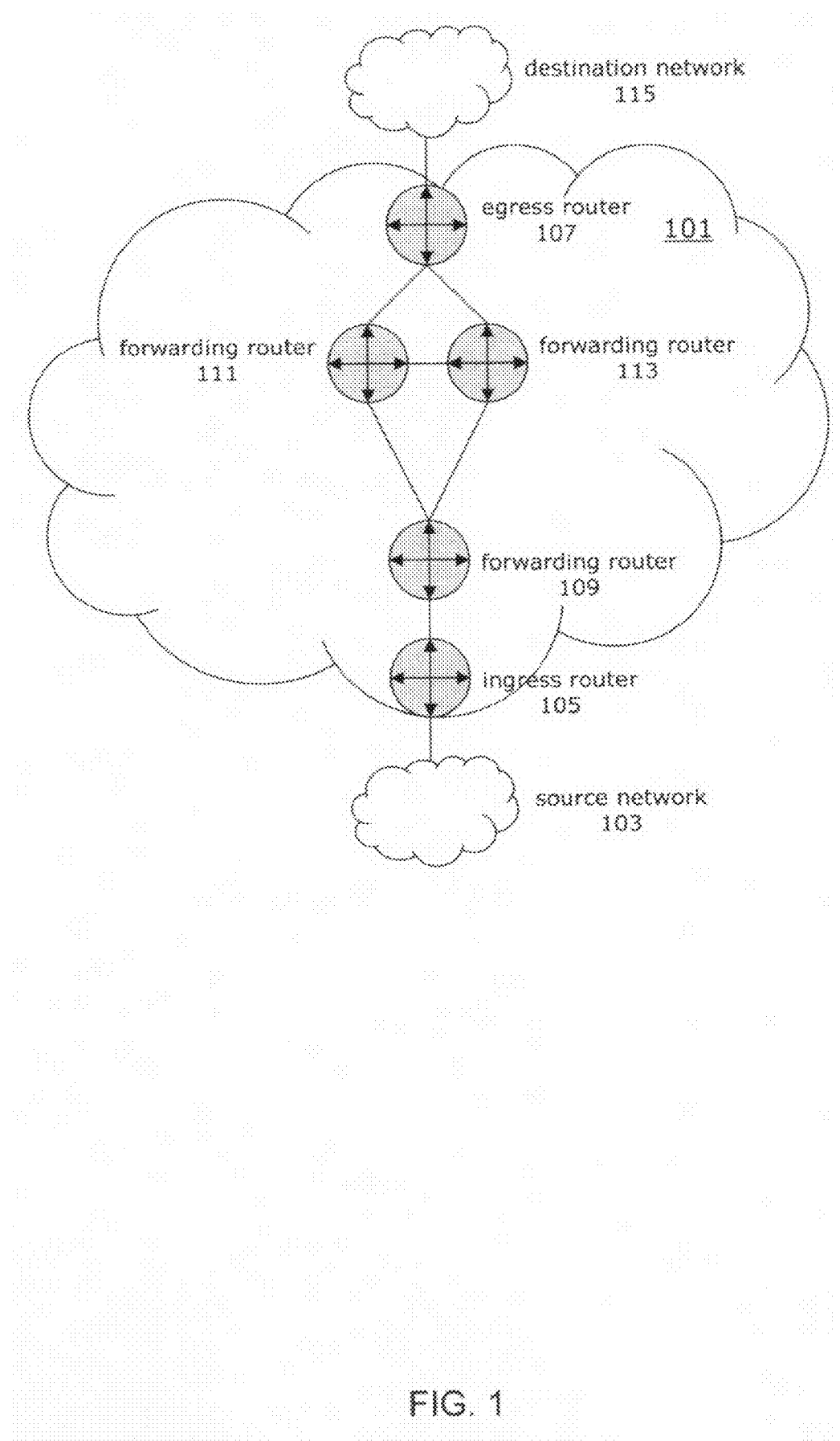
FIG. 1 is an exemplary network.

FIG. 1 shows a typical network 101 that is comprised of a plurality of routers, including a network ingress (Provider Edge (PE)) router 105, an egress (PE) router 107 and network forwarding (Provider (P)) routers 109, 111, 113 depending on the size of the network 101. P routers are strictly interior routers and do not terminate any external connections. Many P routers may be accessed between two PE routers. For example, traffic may enter a PE router in San Diego, Calif., and need to egress on a PE router in Boston, Mass., and traverse a route via a plurality of P routers from San Diego to Los Angeles to Chicago to New York to Boston. FIG. 1 also shows a source network 103 and destination network 115 for which the network 101 provides connectivity.

A router is an electronic device and/or software that connect at least two networks, such as two Local Area Networks (LANs) or Wide Area Networks (WANs), and forwards packets between them. Each packet can traverse many routers, making many hops throughout the Internet as well as multiple routers within a large organization.

A next hop is the next router to which a packet is sent from any given router as it traverses a network from its source to its destination. In the event that the packet is at the final router in its journey, the next hop is the final destination. A hop is the trip that a packet takes from one router to another or from the final router to the destination. A packet, also referred to as a datagram, is a fundamental unit of data transmission on the Internet and other Transmission Control Protocol/Internet Protocol (TCP/IP) networks.

Routers forward data packets between networks using headers and forwarding tables to determine the best path to forward the packets. Routers work at the network layer of the TCP/IP model or layer 3 of the OSI model. Routers also provide interconnectivity between like and unlike media. This is accomplished by examining the header of a data packet, and making a decision on the next hop to which it should be sent. Routers use preconfigured static routes, status of their hardware interfaces, and routing protocols to select the best route between any two subnets.

The next hop for any particular packet at any particular point in its journey is determined, for example, in the Internet by both the Internet Protocol (IP) address of its destination as contained in its header and the routing table in the router at that point. An IP address is a unique numeric identifier for each computer or router on a TCP/IP network. A routing table is a database in a router that stores and frequently updates the IP addresses of reachable networks, called "routes" or "prefixes," and the most efficient path to them.

Embodiments allow for a network comprising routers with limited or constrained memory which initially do not possess necessary routing information to properly forward a received packet(s). The constrained router forwards the received packet(s) to a helper router and generates and forwards a prefix-request to a route server. Both the helper router and route server contain a full routing table of a particular IP network such as the Internet or a Virtual Private Network (VPN).

The prefix-request informs a route server to advertise the longest-match BGP prefix (route) back to the constrained router as a route announcement. The route announcement specifies how to reach the received packet's destination network, i.e., which egress router to use. For example, a destination Uniform Resource Locator (URL) may map to IP address 10.1.2.3, and 10.1.2.3 might be reached by route advertisement 10.1.2.0/24. In this case, 10.1.2.0/24 is shorthand for specifying any route starting with 10.1.2. with any number in the last position of the IP address. The route server responds back to the constrained router with the route announcement which contains the next hop to the most efficient/optimal path.

The route announcement allows the constrained router to learn the routing information to properly forward subsequently received packets to the same destination. Embodiments configure a complete network by analyzing a new or pre-existing network architecture to identify the number of constrained routers and determine the number of route servers and helper routers for support. Each network element may then be configured according to their operating system.

Figure 3:
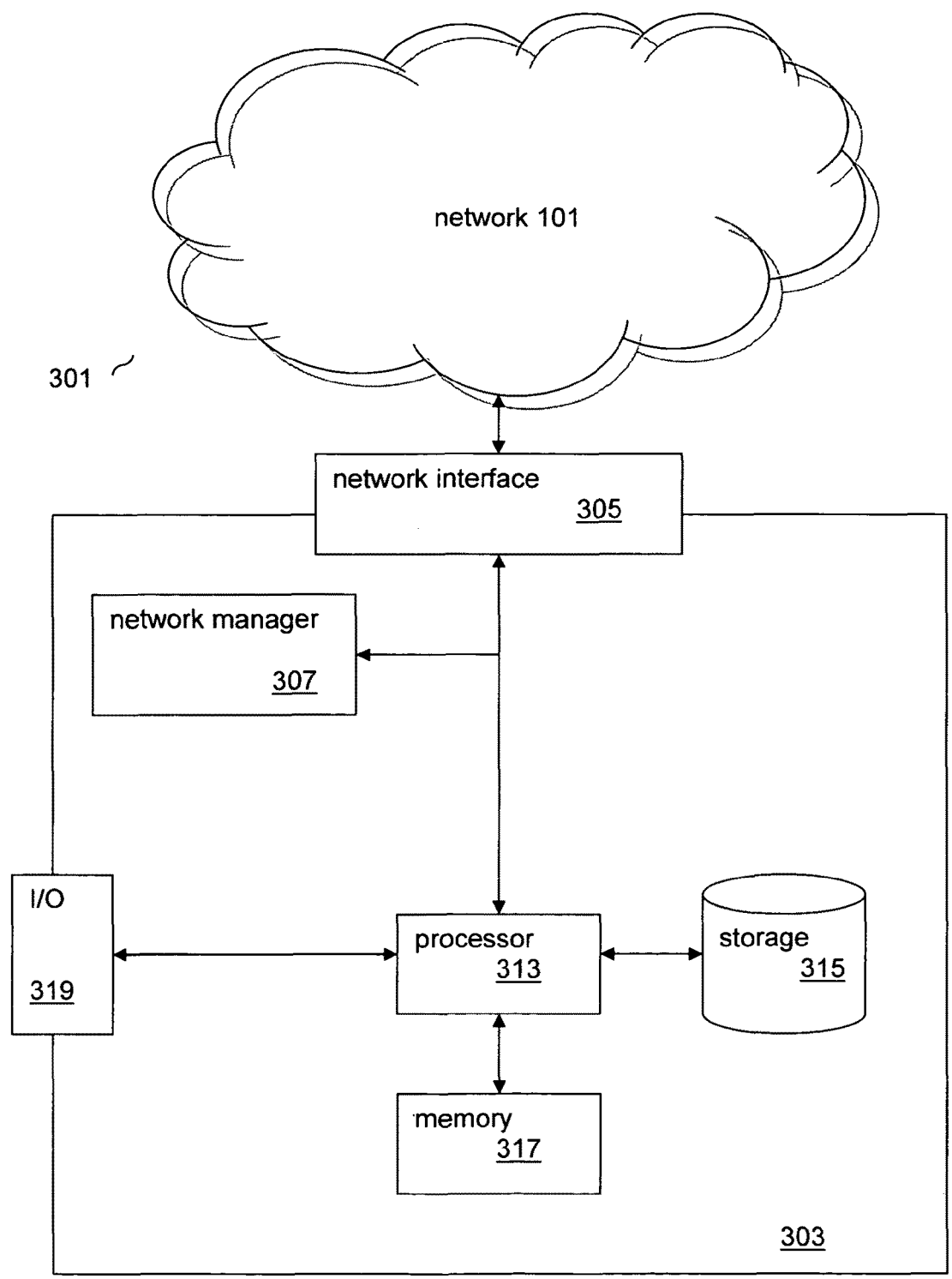
FIG. 3 is an exemplary system framework.
Figure 4A:
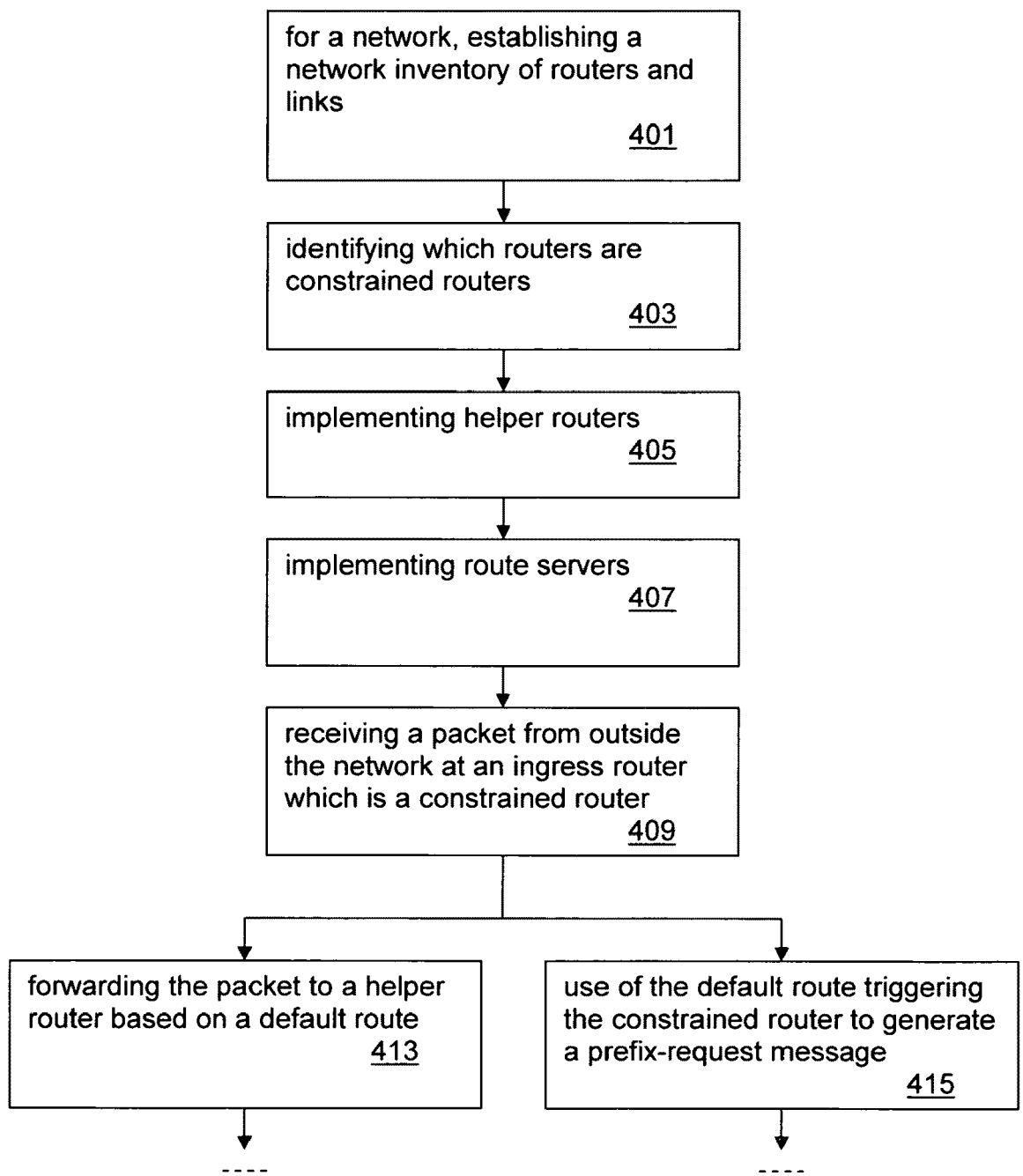
FIG. 4 is an exemplary method.
Figure 4B:
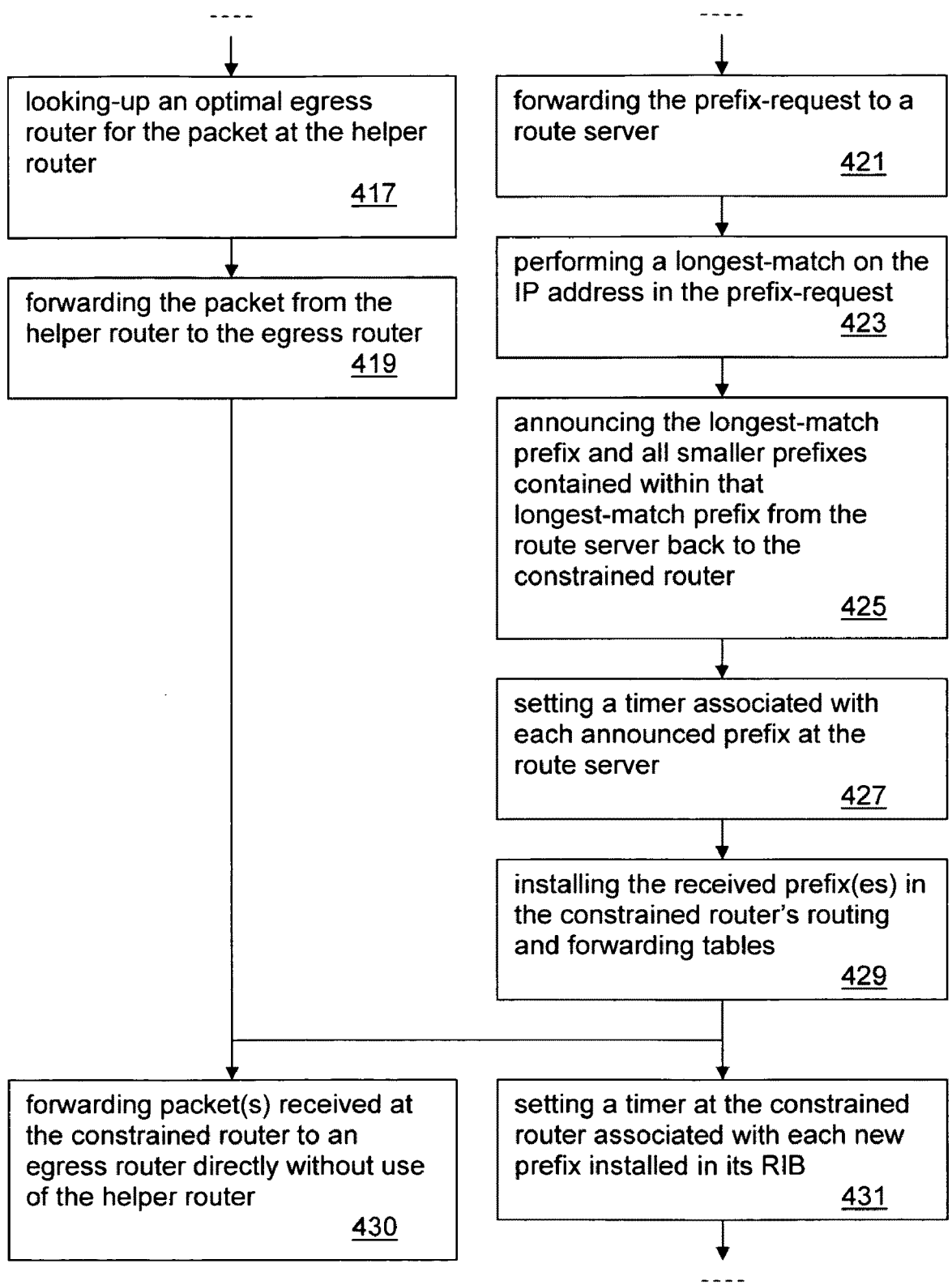
Figure 4C:
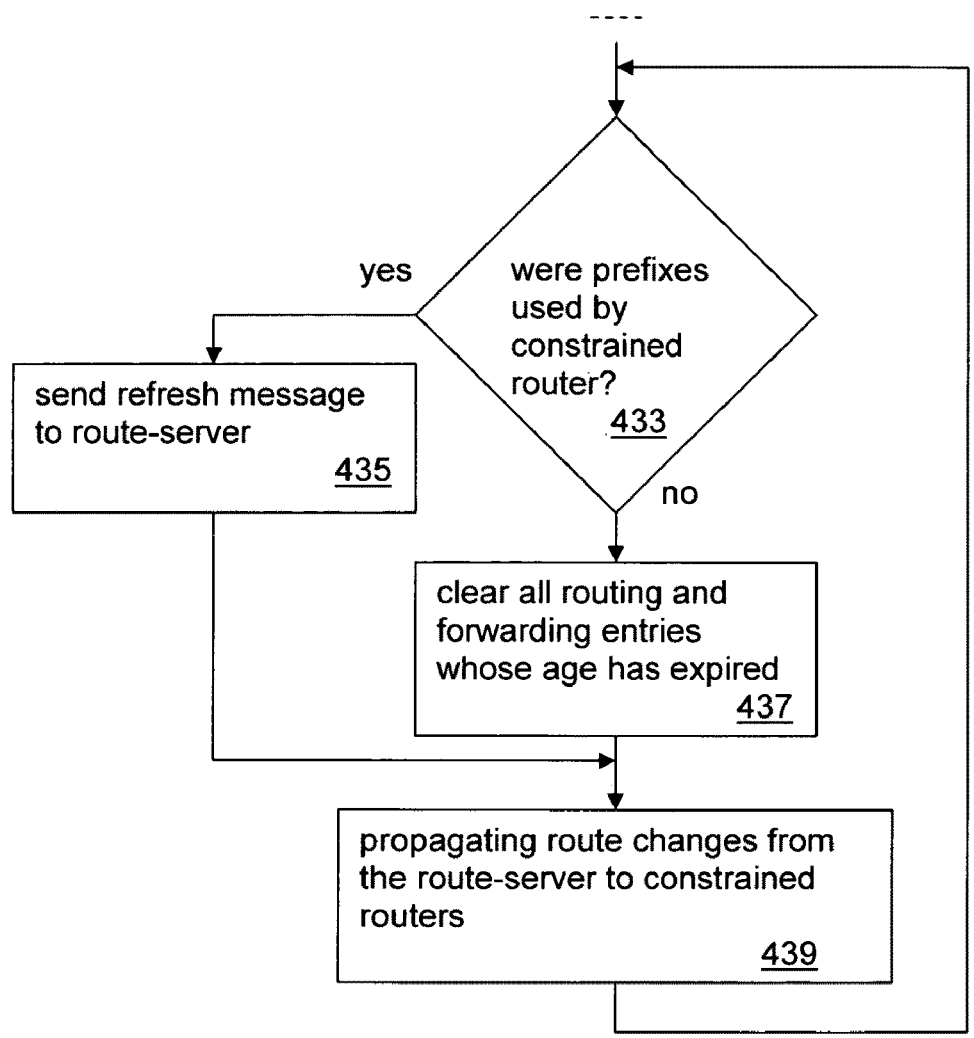

FIG. 3 shows an embodiment of a system 301 framework 303 and FIG. 4 shows a method. The framework 303 which may be part of a network management server includes a network interface 305 coupled to a network and configured to acquire network topology information, network reachability information, as well as network status information to perform network management services. The network interface 305 is coupled to a network manager/inventory database 307, and a processor 313. The processor 313 is coupled to storage 315, memory 317 and I/O 319.

The framework 303 stores acquired network data into a data store 315. The framework 303 may be implemented as a computer including a processor 313, memory 317, storage devices 315, software and other components. The processor 313 is coupled to the network interface 305, I/O 319, storage 315 and memory 317 and controls the overall operation of the computer by executing instructions defining the configuration. The instructions may be stored in the storage device 315, for example, a magnetic disk, and loaded into the memory 317 when executing the configuration. Embodiments may be implemented as an application defined by the computer program instructions stored in the memory 317 and/or storage 315 and controlled by the processor 313 executing the computer program instructions. The computer also includes at least one network interface 305 coupled to and communicating with a network such as shown in FIG. 1 to interrogate and receive network configuration data. The I/O 319 allows for user interaction with the computer via peripheral devices such as a display, a keyboard, a pointing device, and others. The system framework 303 analyzes a new or pre-existing network architecture and identifies which routers are constrained and the number of route servers and helper routers needed, and may assist in configuring the constrained routers, route servers and helper routers.

Figure 2A:
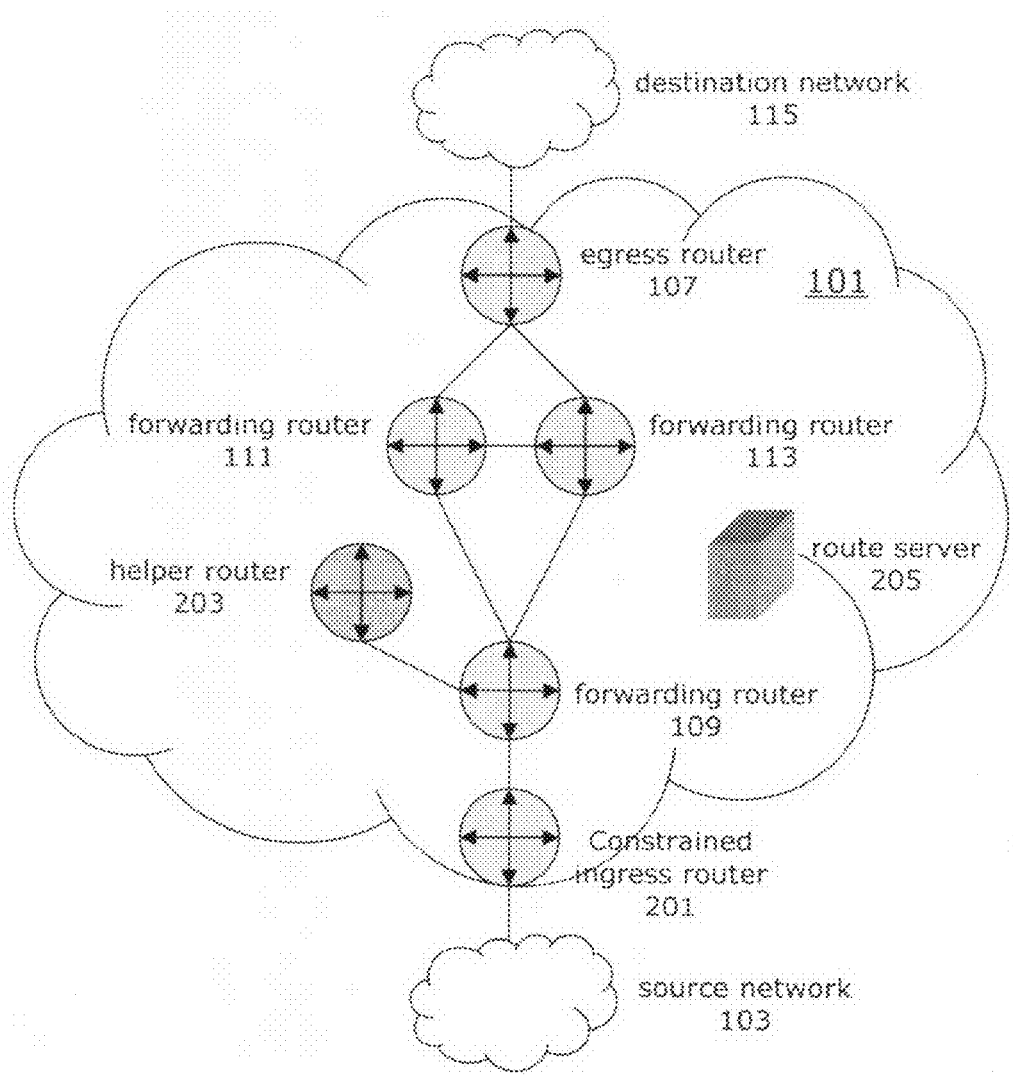
FIGS. 2A-2I is an exemplary network configuration and network flow according to one embodiment.

FIG. 2A shows an exemplary network 101 embodiment result including at least one constrained router 201, at least one helper router 203, and at least one route server 205. Each PE or P router deployed in a network may recognize the situation where the router's memory reaches a certain threshold, and it may switch itself to a mode where it deletes its full routing table and uses the method of the invention. For this embodiment, each router may be preconfigured by the network operator. Alternatively, each network 101 routers' memory may be periodically examined by a network operator or system framework 303 to predict future constrained router candidates.

A helper router 203 is a conventional router having a memory with sufficient capacity for the network in which it is deployed and may be a conventional router sourced from Cisco or Juniper. The functionality of a helper router 203 is like that of a detour. In a prior art network, traffic traverses the shortest path between a PE (ingress) router to a PE (egress) router over one or more P routers. However, if the ingress router does not know how to route the traffic to the egress router, it forwards the traffic to the helper router 203 which contains a full routing table. Embodiments exploit the functionality of how the helper router 203 is used within a network 101.

A route server 205 may be a conventional router, or a general purpose computer running an Operating System (OS) such as Linux, and running routing protocol software including BGP. The route server 205 replies to requests from a constrained router 201. In networks running BGP, Route Reflectors (RR) are commonly deployed. RRs are routers which are dedicated to route exchange only, i.e., they do not pass any customer data packets. The RRs learn routes from PEs and send them to other PEs and other RRs which become RR clients. In this way, each PE does not need to communicate with every other PE—they use RRs as intermediaries. The route server 205 has added capabilities above that of an RR.

The functions of the helper router 203 and route server 205 may be implemented on a device performing other functions, e.g. PE or P functions, or they may be implemented on dedicated physical devices.

In a defined network 101, an inventory is performed of all PE and P routers and links (step 401). The method determines using set thresholds, or prediction, which routers are constrained router candidates 201 based upon router memory and network 101 routing table size (step 403). After the constrained routers 201 are identified, the number of route servers and helper routers must be determined (steps 405, 407). The helper routers may be selected from the remaining pool of PE and P routers having sufficient memory, or may be additional routers. Each constrained router 201, helper router 203 and route server 205 is configured to support the methodology.

The number of helper routers may be determined based on three factors: latency requirements, capacity requirements, and redundancy requirements. When the constrained router forwards packets via the helper router, the packets are traversing a non-optimal path through the network, i.e. a detour. Sufficient helper routers must be implemented to maintain the network operator's latency requirements. One example may be to implement one helper router in each city. Regarding capacity, the helper routers must be sized to meet the expected concurrent traffic load from all constrained routers. For example, $$\sum_i \text{Capacity Helper Router}(i) \geq \sum_j \text{Load Constrained Router}(j), \quad (1)$$

where i is the number of helper routers and j is the number of constrained routers. Lastly, additional helper routers may need to be implemented if redundancy is required, e.g. if 1:1 redundancy is required to protect against failure of any single helper router, twice the number of helper routers will be required than otherwise.

Figure 2B:
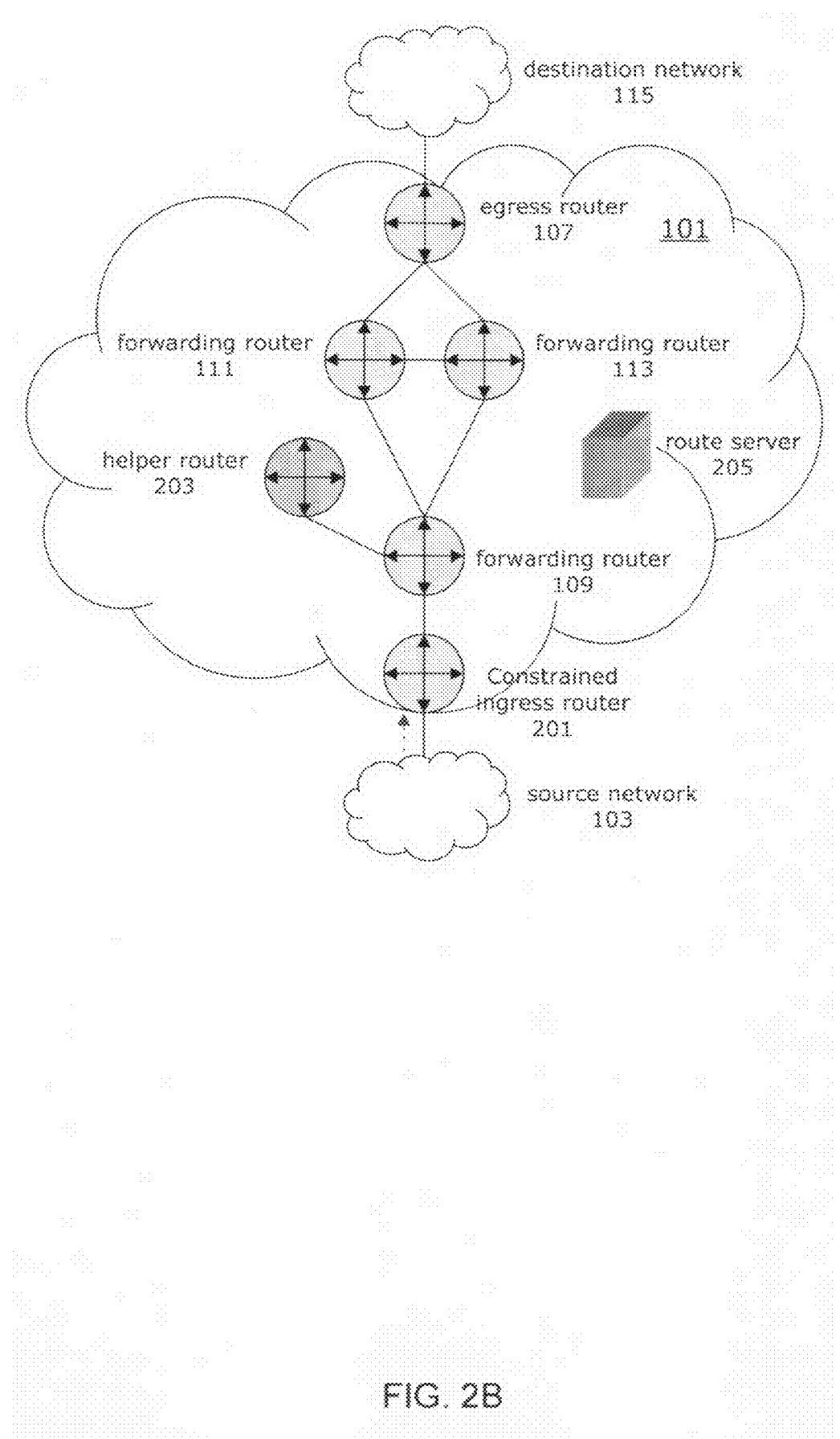

A packet (FIG. 2B, traffic flow is shown as a broken line) is received from outside the network 101 at a PE router 105 which can be a constrained router 201 (step 409). The constrained router 201 receives the packet destined for a network outside of the network 101. The constrained router 201 will perform a lookup in its routing/forwarding tables as per normal operation, but because it is constrained, the router's routing/forwarding tables do not contain the route.

The routing/forwarding tables on the constrained router 201 contain a default route learned from each helper router. This default route may be the well-known IP address of 0.0.0.0/0 or another IP address configured by the operator to be designated as a default route.

Figure 2C:
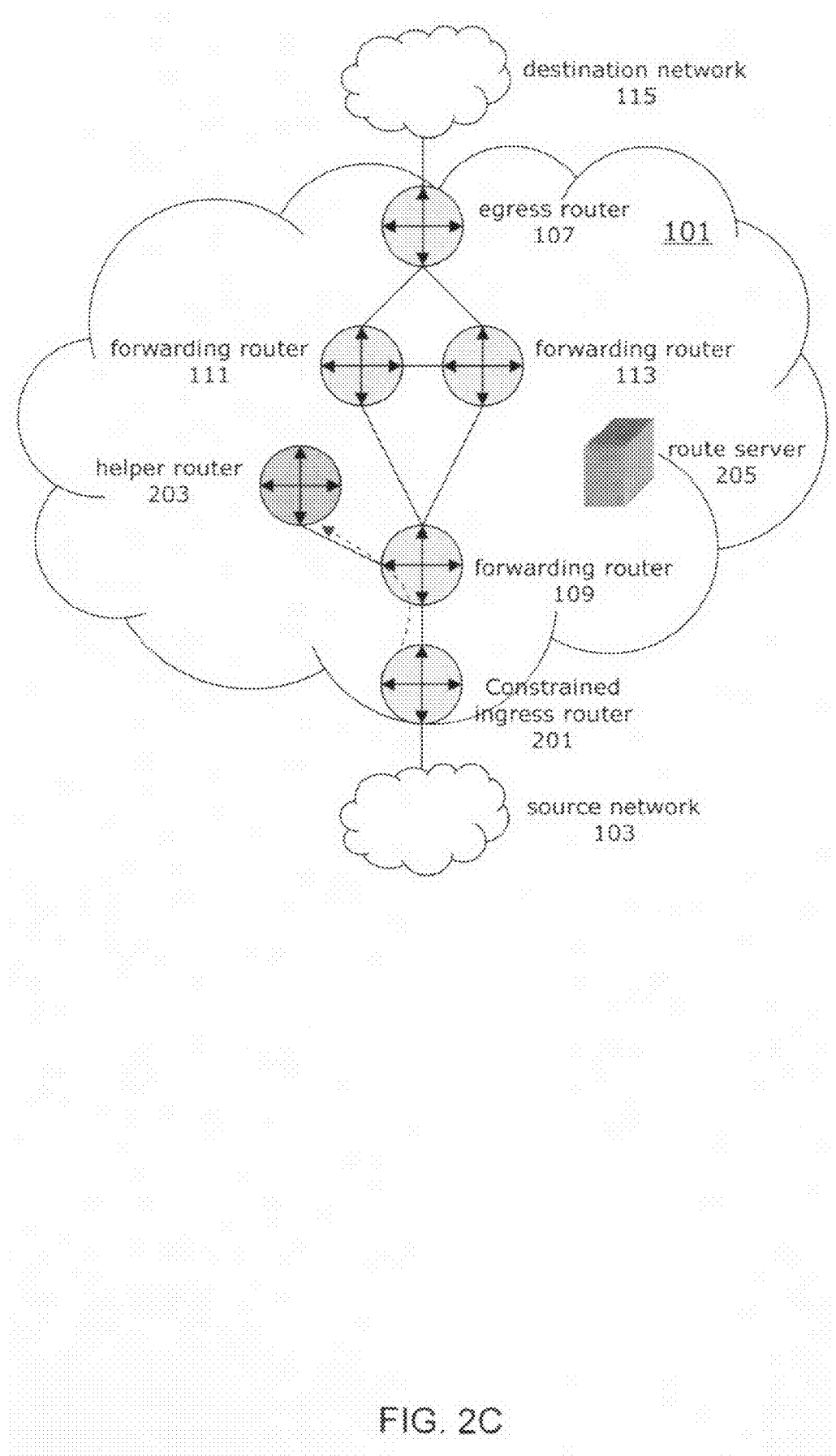
Figure 2D:
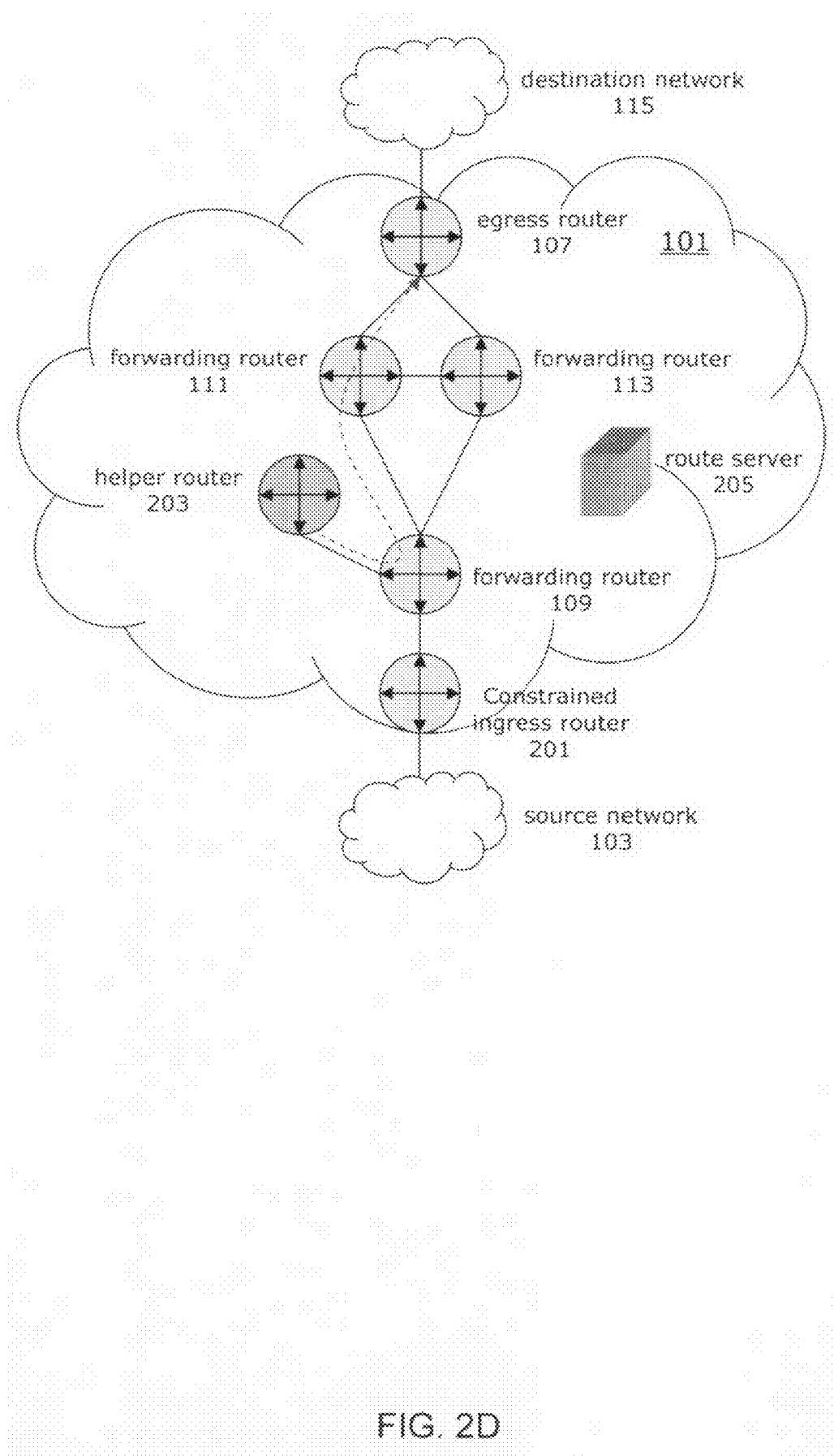
Figure 2E:
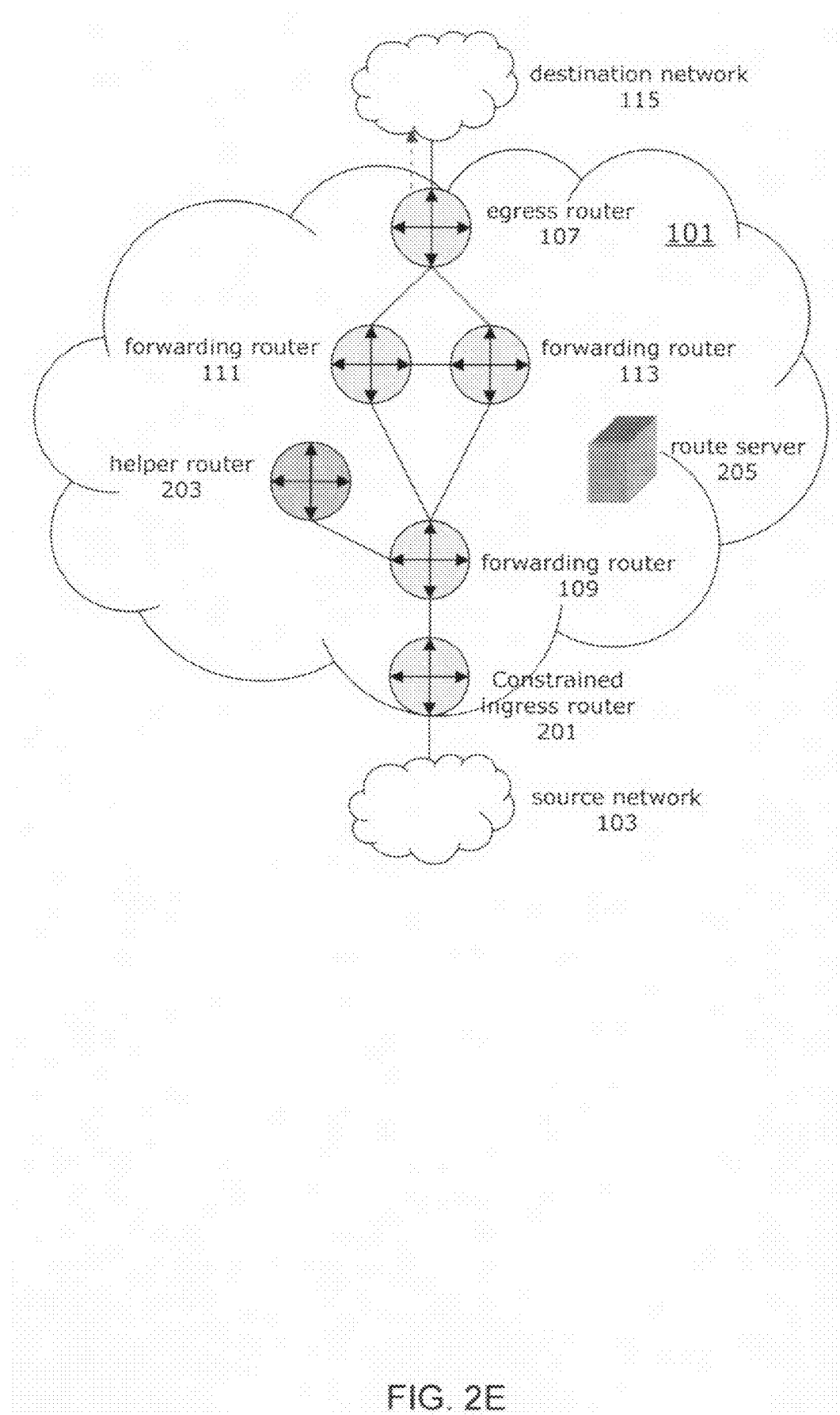

While the routing/forwarding tables on the constrained router 201 do not contain the route to a particular destination, the default route will be used, and the constrained router 201 will forward the packet(s) via the default route for that destination to a helper router 203 (FIG. 2C), where a forwarding look-up is performed by the helper router 203 (steps 413, 417). The helper router 203 identifies the most optimal network PE (egress) router 107. The helper router 203 forwards the packet(s) to the egress router (FIGS. 2D, 2E)(step 419).

In order to obtain the most optimal route for the packet to its destination router, upon receipt of a packet at the constrained router 201 where the router's routing/forwarding tables do not contain the route, the constrained router 201 generates a prefix-request (step 415). The constrained router 201 triggers the prefix-request when a packet is forced to use the default route. The prefix-request is a unique IP datagram that is encapsulated within a Multiprotocol Label Switching (MPLS) packet using a special MPLS label, such as a Router Alert Label, or other label value which may be reserved for this purpose, which notifies the route server 205 to provide special treatment to this packet. The constrained router 201 keeps track of outstanding prefix-requests sent to a route server 205, and avoids sending multiple prefix-requests for the same destination until allowing for sufficient time, configurable by a network operator, for the route server 205 to respond.

The prefix-request is an IP datagram having a source address set to the BGP Router-ID of the constrained router 201. The destination address of the IP datagram would be the same IP address specified in the first packet that was transmitted to the helper router. The IP datagram defines the IP protocol field with a yet-defined value that may be reserved for this purpose (these numbers are assigned by the Internet Assigned Numbers Authority (IANA)). An age or timestamp value can be encoded within the payload or header of the IP datagram specifying the duration of this route entry if required. This age/timestamp encoding can be derived from the constrained router as a "maximum age" function whereby the operator can define the amount of time they feel their router should retain routes for a given entry. Any redundant requests to the route server that provide the same result of a previously ran longest match operation would result in a reset of a counter on the route server for its export BGP policy.

Figure 2F:
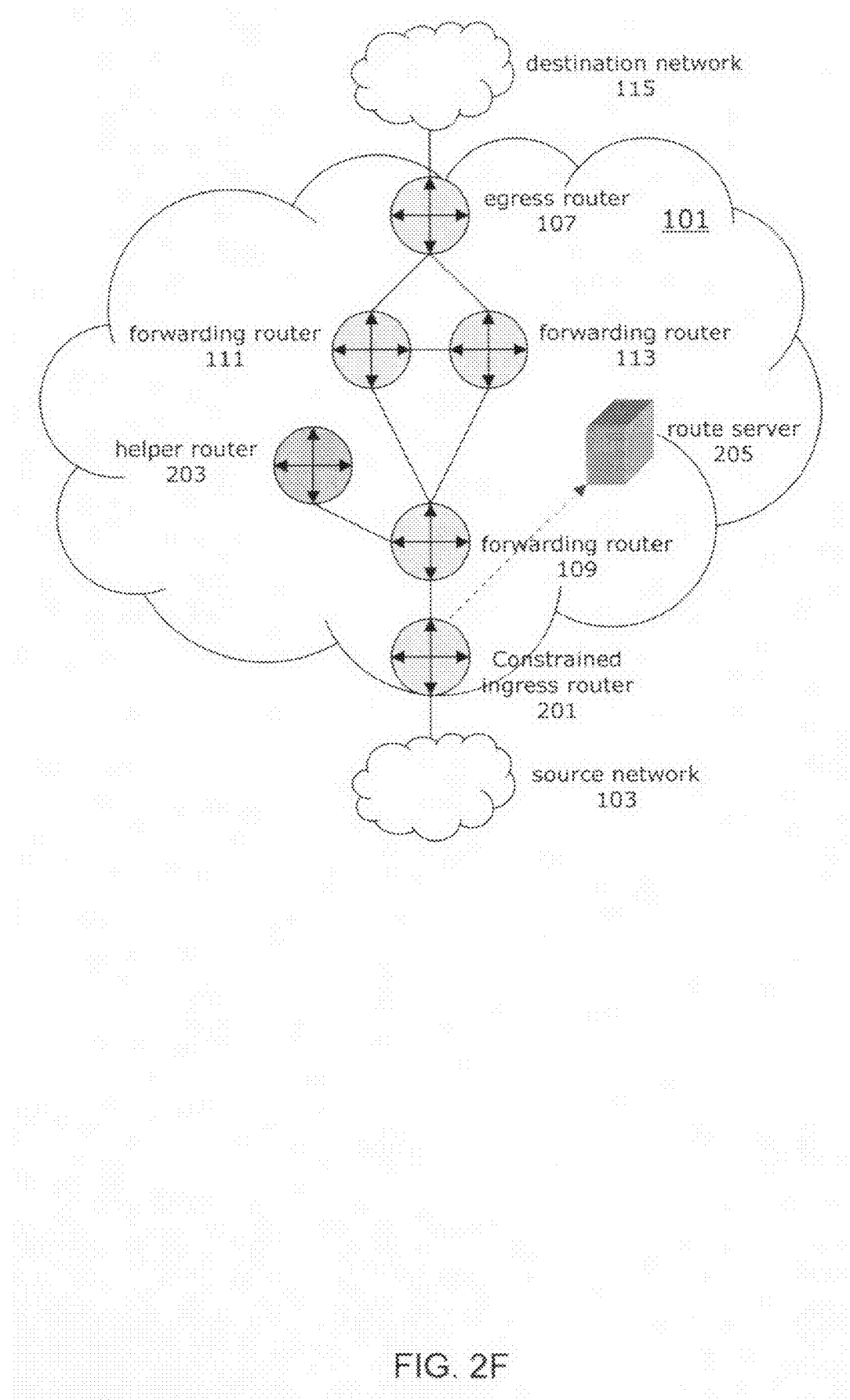

The route server 205 receives the packet in the form of the MPLS Router Alert label with the encapsulated IP datagram (FIG. 2F)(step 421). The route server 205 is programmed to understand that an MPLS Router Alert label in conjunction with a unique IP protocol type is used as a prefix-request. The route server 205 processes the prefix-request separately from standard forwarded traffic.

The route server 205 performs a longest match operation on the IP address in the destination address field (step 423). From this process, it matches the IP address in the destination address field with an existing BGP prefix from its routing table. The route server also matches all prefixes which are more-specific sub-prefixes of the longest match prefix.

Figure 2G:
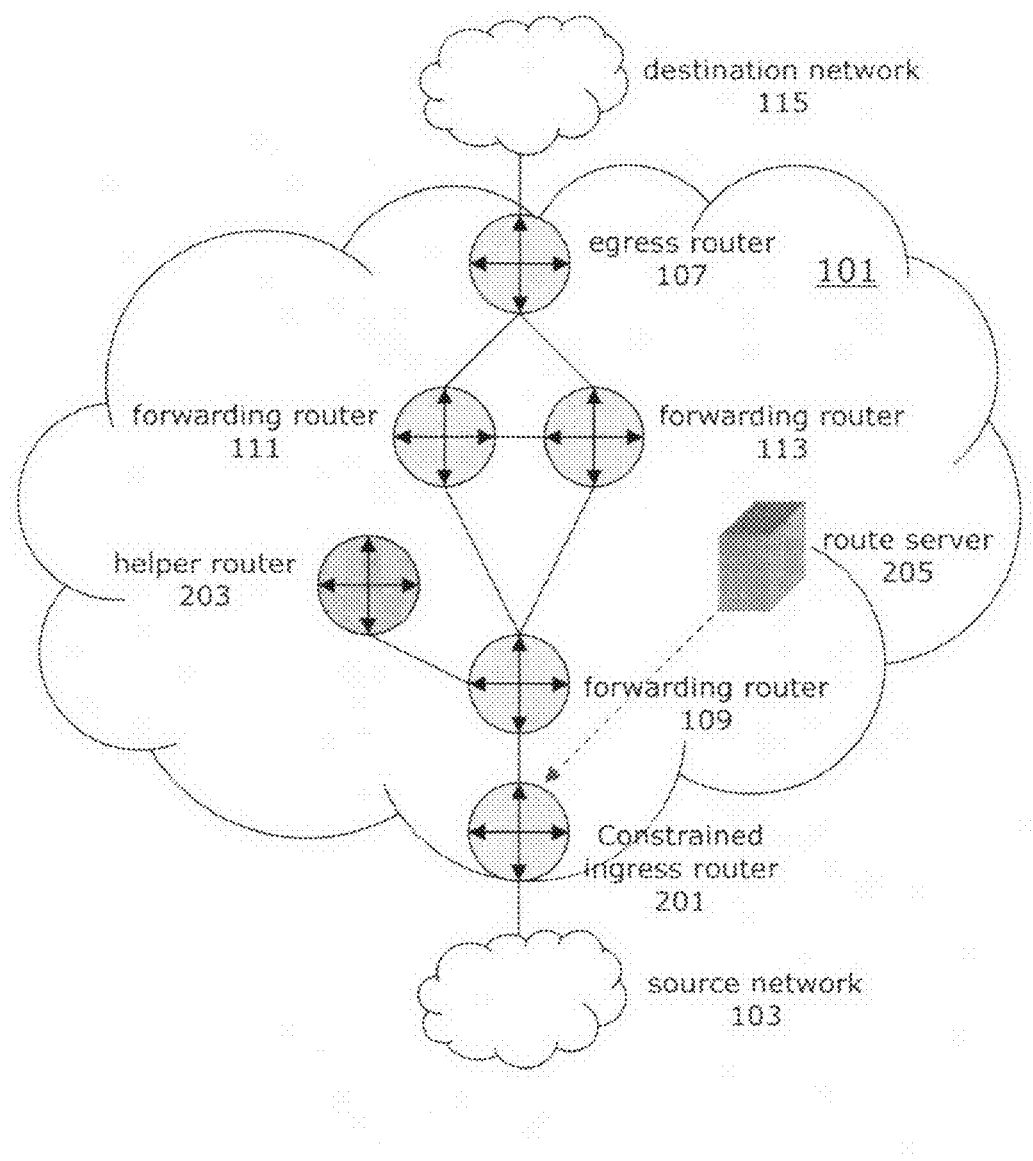

The route server 205 modifies its BGP export policy towards the constrained router 201 to allow the longest-match and any more-specific prefixes matched following the prefix-request. This policy change triggers the route server 205 to forward the routing information for the longest-match and any more-specific prefixes to the constrained router 201 via a BGP update (FIG. 2G)(step 425).

If the route server 205 finds no match following a prefix-request, the destination is unknown. The route server 205 should ignore the prefix request.

The BGP export policy on the route server 205 is a route filter. It is a list of routes which are permitted or denied. The filter controls which routes are permitted to be sent to the constrained router 201. For example, if the route server 205 subsequently learns of a more specific BGP prefix which matches the original prefix-request, then that more specific prefix must also be propagated to the constrained router 201. This results in a gratuitous announcement being sent, i.e., more than one BGP announcement sent in response to a single prefix-request.

Figure 2H:
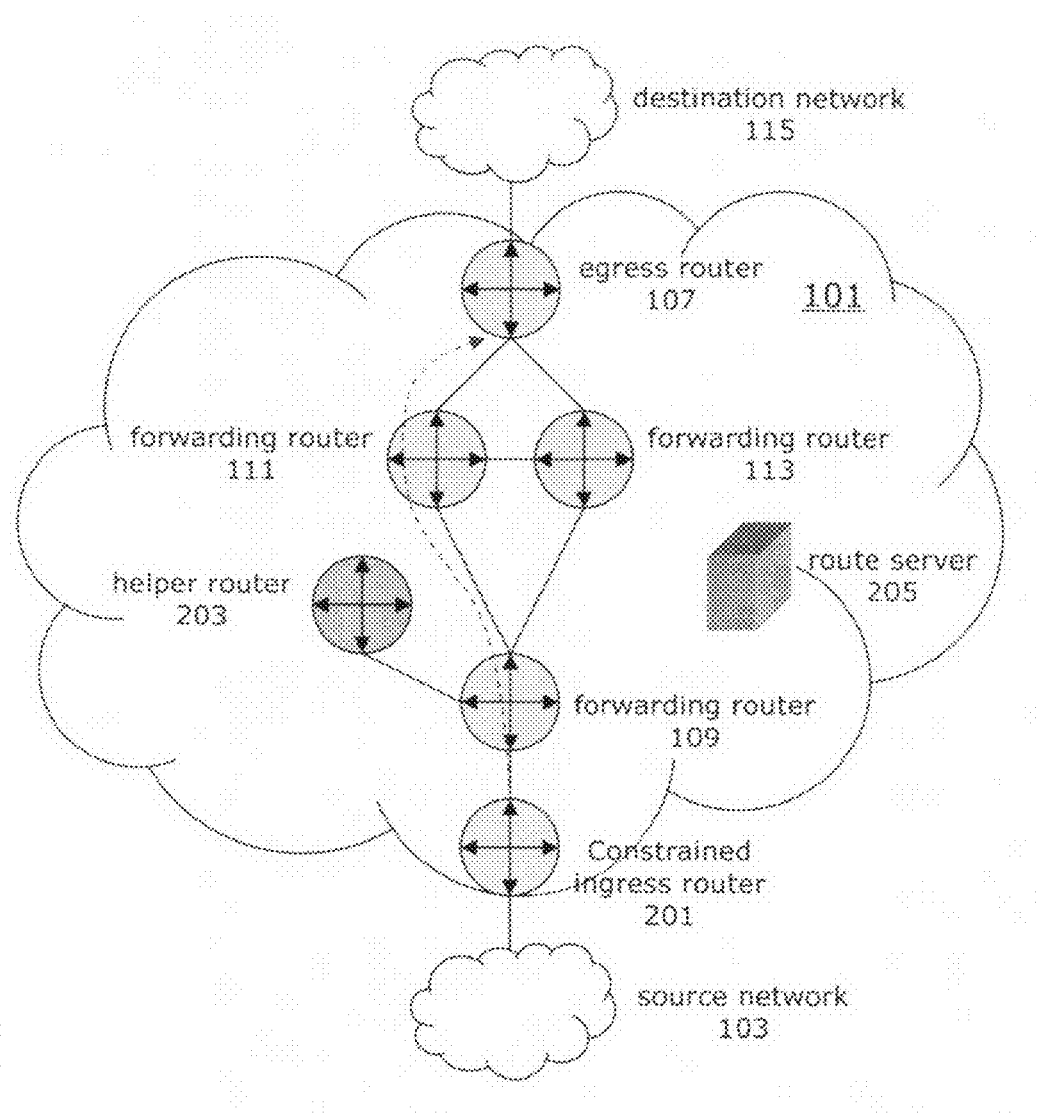
Figure 2I:
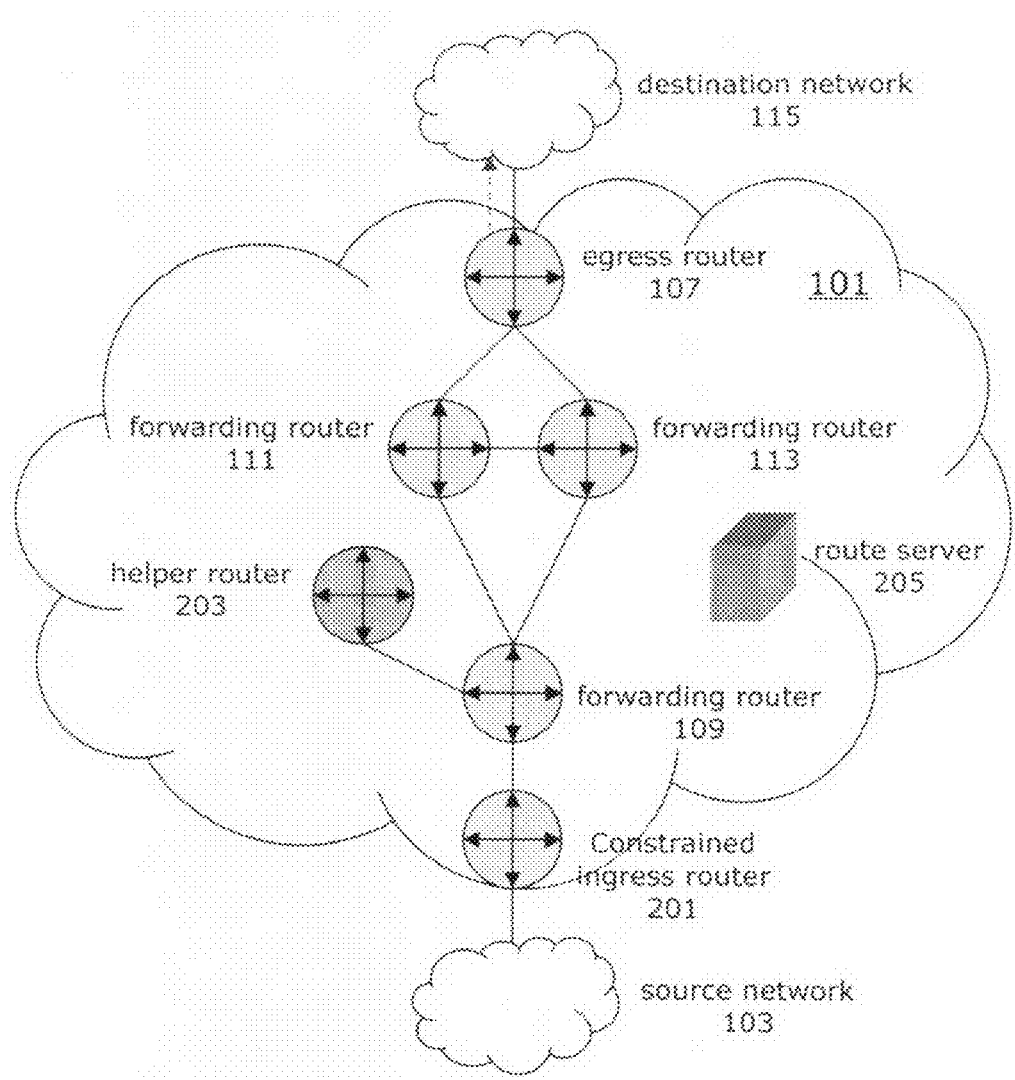

The constrained router 201 receives the BGP prefix announcement from the route server 205 and installs the prefix into its routing table and forwarding table (step 429). The addition of the prefix into these tables causes the constrained router 201 to stop using the default route to send packets via the helper router. Since this prefix announcement contains the BGP next hop address of an egress router 107, it informs the constrained router 201 of the exact router to which it should transmit packets to egress the network, providing a short-cut, and avoiding the need to continue to transmit those packets via the helper router 203 (FIGS. 2H, 2I) (step 430).

To promote efficient use of resources for both the constrained router 201 and route server 205, an age timer associated with every BGP prefix received is started (steps 427, 431). The route server 205 sets the age of the updated export policy based on the age requested in the original prefix-request. Unless the request is refreshed, after the timer expires, the route server 205 modifies its export policy to the constrained router to no longer allow the prefix(es) originally requested.

This results in a BGP prefix-withdrawal to be sent by the route server 205 to the constrained router 201. The constrained router 201 also sets an age on the prefix learned from the route server 205. There are two separate timers maintained, one at the route server 205 when the route announcement is sent and one at the constrained router 201 when it is received. Both timers are set to the (same) value as requested in the prefix request. The timers exist in both places to protect against loss of communication between the route server 205 and the constrained router 201. If only one timer was at the route server, but the route server lost communication to the constrained router, the constrained router would hold on to the prefix forever. This is the same age requested in its prefix-request.

The constrained router 201 keeps an accounting of whether it forwards packets using a learned prefix (step 433) by setting a flag, which is initialized to "false," to now be "true" on the prefix to indicate it was used at least once. If the constrained router 201 uses the learned prefix, the constrained router 201 must send a refresh message to the route server 205 before the age timer expires (step 435). The refresh is formatted the same as the original prefix-request, but rather than containing the original host-specific destination address, it contains the prefix learned from the route server 205. Following a refresh, the only action taken by the constrained router 201 and route server 205 is to reset the age, i.e., the export policy change and BGP update message does not need to be performed again. Each time the age gets reset, the flag indicating the prefix was used must also be reset to "false."

If a refresh is not requested, the constrained router 201 and route server 205 clear all routing entries (step 437) related to the expired prefix(es). If the constrained router 201 still needs to transit packets to the same destination address again, it will restart the process.

If the route server 205 learns about a change related to any of the prefixes it has announced to the constrained router, e.g. a route withdrawal or a change in next-hop IP address, the route server 205 propagates that change to the constrained router 201 to which the route was sent (step 439).

One or more embodiments of the present invention have been described. Nevertheless, it will be understood that various modifications may be made without departing from the spirit and scope of the invention. Accordingly, other embodiments are within the scope of the following claims.

What is claimed is:

1. A method for disassociating routing tables and forwarding tables from routers used in a network comprising:

implementing a route server running a dynamic routing protocol and having a full route table for the network, which may receive prefix requests from any router in the network;

implementing a helper router having a full route table for the network, wherein a helper router may receive packets from, and forward those packets on behalf of any router in the network;

receiving a packet at a constrained router running a dynamic routing protocol, wherein a router is constrained if the router's memory capacity cannot store the full route table for the network;

performing a route lookup at the constrained router for the destination address of the received packet and not finding a match other than a default route;

generating a prefix-request at the constrained router;

transmitting the prefix-request containing the destination address of the received packet from the constrained router to the route server contemporaneous with forwarding the received packet at the constrained router and subsequently received packets for that destination address to the helper router where a forwarding look-up is performed;

at the route server, performing a longest-match on the destination address in the prefix-request;

forwarding the packet(s) received at the helper router to an egress router; and advertising a route announcement via a dynamic routing protocol containing a prefix from the route server in response to the prefix-request from the constrained router wherein the route announcement identifies an optimal next hop for the received packet.

2. The method according to claim 1 wherein the prefix-request is a datagram.

3. The method according to claim 2 wherein the prefix-request further comprises:
    a source address corresponding to the constrained router;
    a destination address corresponding to the destination of the received packet;
    a protocol type identifying the datagram as a prefix-request; and
    a length of time the constrained router is allowed to use the route announcement prefix.

4. The method according to claim 3 wherein the prefix-request further comprises a Multiprotocol Label Switching (MPLS) packet identified with a special label.

5. The method according to claim 1 further comprising stopping the forwarding of packets received at the constrained router to the helper router after receipt of the route announcement from the route server at the constrained router.

6. The method according to claim 1 wherein a router is identified as a constrained router based on the router's memory capacity and predicted network route table growth.

7. The method according to claim 1 wherein the constrained router further comprises keeping track of outstanding prefix-requests sent to the route server to avoid sending multiple prefix-requests for the same destination address.

8. The method according to claim 1 further comprising installing the advertised route announcement in the constrained router's routing table and forwarding table.

9. A data communications network comprising:
    a plurality of interconnected routers comprising:
    a router configured to have a full routing table wherein the router having a full routing table announces itself to the network using a default route and Border Gateway Protocol (BGP) routing protocol and may receive packets from, and forward those packets to any router in the network;
    a route server configured to have a full routing table; and
    a router lacking a full routing table wherein the router lacking a full routing table receives a packet having a destination and forwards the packet and subsequently received packets for that destination address to the router having a full routing table using the default route and contemporaneously forwards a prefix-request to the route server where a next hop look-up for the packet's destination is performed, the router having a full routing table forwards the packet to an egress router and the route server advertises a longest-match route prefix announcement for the packet.

10. The network according to claim 9 wherein the router lacking a full routing table may have insufficient hardware and software resources capable of containing a full routing table.

11. The network according to claim 9 wherein the router lacking a full routing table stops forwarding received packets to the router having a full routing table after the longest-match route prefix announcement for the packet's destination is received at the router lacking a full routing table.

12. The network according to claim 9 wherein the prefix-request further comprises:
    a source address corresponding to the router lacking a full routing table;
    a destination address corresponding to the destination of the received packet;
    a protocol type identifying the datagram as a prefix-request; and
    a length of time the router lacking a full routing table is allowed to use the route prefix.

13. A method for disassociating routing tables from routers used in a network comprising:
    implementing a helper router having a full route table for the network, wherein a helper router may receive packets from, and forward those packets on behalf of any router in the network;
    implementing a route server running a dynamic routing protocol and having a full route table for the network, which may receive prefix requests from any router in the network;
    receiving a packet at a constrained router running a dynamic routing protocol;
    performing a route lookup at the constrained router for the destination address of the received packet and not finding a match other than a default route;
    generating a prefix-request at the constrained router containing the destination address of the received packet;
    forwarding the received packet and subsequently received packets for that destination address at the constrained router to the helper router where a forwarding look-up is performed contemporaneous with transmitting the prefix-request from the constrained router to the route server;
    forwarding the packet(s) received at the helper router to an egress router; and
    advertising a route announcement via a dynamic routing protocol containing a prefix from the route server containing an optimal next hop for the received packet.

14. The method according to claim 13 wherein the prefix-request is a datagram.

15. The method according to claim 14 wherein the prefix-request datagram further comprises:
    a source address corresponding to the constrained router;
    a destination address corresponding to the destination of the received packet;
    a protocol type identifying the datagram as a prefix-request; and
    a length of time the constrained router is allowed to use the advertised route announcement prefix.

16. The method according to claim 13 further comprising stopping the forwarding of packets received at the constrained router to the helper router after receipt of the route announcement from the route server at the constrained router.

17. The method according to claim 13 wherein the constrained router further comprises keeping track of outstanding prefix-requests sent to the route server to avoid sending multiple prefix-requests for the same destination address.

18. The method according to claim 13 further comprising installing the advertised route announcement in the constrained router's routing table and forwarding table.

* * * * *